US009366169B2

(12) United States Patent
Pohl et al.

(10) Patent No.: US 9,366,169 B2
(45) Date of Patent: Jun. 14, 2016

(54) SEAL FOR AN EXHAUST AFTERTREATMENT DEVICE IN AN INTERNAL COMBUSTION ENGINE

(71) Applicant: Robert Bosch GmbH, Stuttgart (DE)

(72) Inventors: Stephan Pohl, Schwieberdingen (DE); Martin Kiontke, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/374,984

(22) PCT Filed: Jan. 4, 2013

(86) PCT No.: PCT/EP2013/050074
§ 371 (c)(1),
(2) Date: Jul. 28, 2014

(87) PCT Pub. No.: WO2013/110483
PCT Pub. Date: Aug. 1, 2013

(65) Prior Publication Data
US 2015/0093302 A1    Apr. 2, 2015

(30) Foreign Application Priority Data
Jan. 27, 2012    (DE) .......................... 10 2012 201 189

(51) Int. Cl.
*F01N 3/24*    (2006.01)
*F01N 3/20*    (2006.01)

(52) U.S. Cl.
CPC ................ *F01N 3/24* (2013.01); *F01N 3/2066* (2013.01); *F01N 2260/20* (2013.01); *F01N 2610/02* (2013.01); *F01N 2610/11* (2013.01); *F01N 2610/1453* (2013.01); *Y02T 10/24* (2013.01)

(58) Field of Classification Search
CPC ..... F01N 3/2066; F01N 3/24; F01N 2610/02; F01N 2610/11; F01N 2610/1453; F01N 2260/20; B01D 53/90
USPC ............................................ 60/295; 422/172
See application file for complete search history.

(56) References Cited

U.S. PATENT DOCUMENTS

| 2,307,440 | A | * | 1/1943 | Wilson | .................... | F16L 23/20 |
| | | | | | | 285/917 |
| 5,524,906 | A | * | 6/1996 | Rackov | .................. | F16J 15/061 |
| | | | | | | 285/917 |
| 6,814,303 | B2 | | 11/2004 | Edgar et al. | | |
| 9,003,775 | B2 | * | 4/2015 | Wright | .................. | F01N 3/2066 |
| | | | | | | 60/295 |
| 2010/0320285 | A1 | | 12/2010 | Haeberer et al. | | |

FOREIGN PATENT DOCUMENTS

| DE | 102008055080 | 7/2010 |
| DE | 102009027185 | 12/2010 |
| DE | 102009027693 | 5/2011 |
| WO | WO2010/133685 | * 11/2010 |

OTHER PUBLICATIONS

International Search Report for Application No. PCT/EP2013/050074 dated Apr. 24, 2013 (English Translation, 2 pages).

* cited by examiner

*Primary Examiner* — Jill Warden
*Assistant Examiner* — Joye L Woodard
(74) *Attorney, Agent, or Firm* — Michael Best & Friedrich LLP

(57) ABSTRACT

A dosing module (1) for introducing a reducing agent into an exhaust system of an internal combustion engine for exhaust aftertreatment. The dosing module (1) comprises a flange (20). The flange (20) is secured to a connecting flange (11) on an exhaust pipe. A sealing element (22) located between the flange (20) and the connecting flange (11) is designed as a single layer and separates an interior (26) of the exhaust pipe from an exterior (27) of the exhaust pipe. The sealing element (22) is disposed in the area of the center of gravity (42) of the dosing module (1).

18 Claims, 4 Drawing Sheets

SEAL FOR AN EXHAUST AFTERTREATMENT DEVICE IN AN INTERNAL COMBUSTION ENGINE

BACKGROUND OF THE INVENTION

The invention relates to a seal for an exhaust aftertreatment device in an internal combustion engine.

In the case of dosing devices for DENOX systems, for example, use is made of a dosing module which contains a dosing valve for injecting the reducing agent into the exhaust zone and which ensures the attachment of hydraulic components and the cooling of the unit. For connection to the exhaust zone, the dosing module has a flange, which is flanged to a mating flange on the exhaust pipe. Because of manufacturing tolerances and roughness of the mating flange on the exhaust pipe, there is the risk of leaks, especially at the transition from the interior of the exhaust pipe to the exterior. In DENOX systems, the reducing agent AdBlue®, which is distinguished by very high creep properties, is generally dosed in. If the reducing agent escapes, white crystals form on the outside of the dosing device. Ammonia which escapes during this process is toxic. A particular challenge with such an exhaust aftertreatment device is therefore the sealing of the interior of the exhaust system with respect to the surroundings, not only because of the exhaust gases but especially because of the reducing agent.

In order to prevent the exhaust gases and the reducing agent from escaping, DE 10 2006 061 730 A1 discloses the practice of fitting a seal between the exhaust pipe and the dosing device, said seal comprising a sealing element which rests flat on a flange of the dosing module and on a mating flange of the exhaust pipe. The dosing module is secured by means of a V clamp, which nonpositively connects a flange of the exhaust pipe to a retaining structure for the dosing module.

U.S. Pat. No. 6,814,303 B2 discloses a fluid-cooled mount for an injector, by means of which an aqueous urea solution is introduced into an exhaust section. In this case, the injector body is seated on oblique internal walls of a mounting piece, wherein a seal, which can be designed as an O-ring or as a flat gasket, is provided at the point of contact.

SUMMARY OF THE INVENTION

According to the invention, a proposal is made for a dosing module which is used to introduce a reducing agent into an exhaust section of an internal combustion engine for exhaust aftertreatment. The dosing module proposed according to the invention comprises a flange, which is secured on the connecting flange of an exhaust pipe, wherein a sealing element, which separates an interior of the dosing module from an exterior and which is, in particular, of single-layer design and is arranged in the region of the center of gravity of the dosing module, is arranged between the flange and the connecting flange. In particular, this allows reduced-vibration and optimized-strength connection of the dosing module proposed according to the invention to the exhaust system. Since the center of gravity of the dosing module is generally further up in the dosing module, the sealing surface is further away from the point at which the reducing agent is introduced into the exhaust section by the dosing module at the valve tip of the dosing module.

The sealing element comprises at least one line of high pressure extending circumferentially around the sealing element between materials in mutual contact. It can also comprise a plurality of circumferentially extending lines of high pressure between materials in mutual contact which can, in particular, be circular and can be arranged concentrically with respect to one another. The linear seal preferably comprises at least one circumferentially extending line of high pressure between the sealing element and the flange of the dosing module and at least one further circumferentially extending line of high pressure between the sealing element and the connecting flange of the exhaust pipe, thus preventing the exhaust gases or the reducing agent from escaping from the interior of the exhaust pipe into the exterior between the sealing element and the flange of the dosing module and between the sealing element and the mating flange of the exhaust pipe. In particular, the circumferentially extending lines of high pressure can be circular lines and can extend concentrically with respect to one another.

An advantage with the linear seal is that higher pressures between the materials can be set on a sealing line than would be possible, for example, in the case of a flat gasket over the entire sealing surface thereof. By virtue of the linear seal, the flange and the connecting flange of the exhaust pipe are subjected to high forces in a linear fashion along the sealing line, and this leads to the non-occurrence of leaks to the surroundings, despite manufacturing tolerances and roughness of the connecting flange.

According to a preferred embodiment, the sealing element is embodied as a bead or a half bead, in particular a metal bead or half bead. The beads are introduced into the material by punching or in a deep drawing process and/or manually using a grooving hammer and/or a grooving anvil and/or by machine, using a beading machine with the aid of two beading rollers, for example, and allow very economical manufacture of the sealing element.

The embodiment as a full bead or as a half bead has the effect that at least two microbends forming the linear seal are formed in the assembled state. At least one first microbend extends in the sealing element in the direction of the flange of the dosing module, and at least one second microbend extends in the sealing element in the direction of the connecting flange of the exhaust pipe. In the installed state, the clamping of the sealing element designed as a half bead or full bead between the flange and the connecting flange has the effect that the first microbend forms a first sealing line with the flange of the dosing module for the interior of the exhaust pipe with respect to the exterior, and the second microbend forms a second sealing line with the connecting flange of the exhaust pipe for the interior of the exhaust pipe with respect to the exterior. In the sense according to the present invention, this is referred to jointly as a linear seal. An escape of the reducing agent into the surroundings is thus not possible either at the dosing module or at the exhaust pipe, despite the occurrence of manufacturing tolerances. The half bead or full bead preferably slopes by an identical angle relative to a radial plane as a sloping surface of the flange on the dosing module and/or the connecting flange on the exhaust pipe.

The sealing element is preferably designed as a single-layer ring of material, in particular as a single-layer metal ring. It is particularly advantageous that, in the case of a single-layer embodiment of the sealing element, costs arising from the production of a double layer and, where applicable, additionally required bordering are avoided. The single-layer embodiment is advantageous particularly when only very little space is available radially, which is often the case at the connecting flange. By means of the metal ring embodied as a single layer, effective sealing can be provided with a radial extent of a sealing surface of the connecting flange of as little as 4 mm, but also with larger radial extents. In certain circumstances, it would not be possible to deform a metal ring of multilayer design, in particular two-layer design, over this narrow range to give an effective linear seal element. In the case of a metal ring of multilayer design, in particular two-layer design, there is furthermore also a gap between the metal rings, which can represent a further potential leakage point with respect to the surroundings.

The sealing element preferably has retaining projections, which are supported against a wall of the outer sleeve of the dosing module. The retaining projections are practical particularly during the transportation of the dosing module since the dosing module can be brought to the assembly location with the sealing element already inserted. Pre-centering of the sealing element is thereby furthermore achieved, ensuring that the two sealing lines that form on the flange and on the connecting flange produce uniform sealing over the circumference.

The flange of the dosing module preferably has at least one sloping flange surface, wherein the slope angle is between 10° and 45°, preferably between 15° and 25°, particularly preferably about 20°, relative to a radial plane. In this case, the angle is preferably chosen in such a way that the flange tapers at an acute angle toward the outer circumference thereof. As an alternative, the angle can also be chosen in such a way that the flange tapers at an acute angle toward the center thereof. The radial plane can be defined by an outlet opening of the connecting flange or by an end face of the flange. The radial plane can also be defined in such a way that it is substantially perpendicular to the injector or to a principal axis of the injection valve.

The connecting flange preferably has the same slope as the sloping flange portion of the dosing module, namely between 10° and 45°, preferably 15° to 25°, particularly preferably 20°. Here, the angle is preferably defined in such a way that the connecting flange of the exhaust pipe tapers at an acute angle toward the center thereof, but can also be chosen in such a way that the mating flange of the exhaust pipe tapers at an acute angle to the outer circumference thereof.

It is particularly advantageous that there is a smaller space requirement in the case of a sloping flange and connecting flange surface when compared with seals of horizontal design, in which the sealing surfaces of the flange and of the connecting flange are embodied in such a way as to extend substantially in the radial plane. An effectively increased sealing surface in comparison with a horizontal embodiment is thereby achieved within the same radial installation space. The slope of the flange and of the connecting flange allows a radial shortening of the sealing element by a factor which corresponds to the cosine of the included angle or an effective extension of the sealing element by one divided by the factor. This is advantageous particularly if the radial width of the connecting flange is limited.

The flange and the connecting flange are preferably held by a clamp, which clamps them against one another. In a preferred embodiment, the clamp has contact pressure flanks, which rest in full surface contact on the outer surface of the dosing module flange. The sealing surface of the dosing module furthermore preferably slopes at the same angle as the contact pressure flank of the clamp. Optimum force transmission, namely axial clamping of the flange and the connecting flange, is thereby achieved, increasing the leaktightness of the seal. Through direct introduction of the clamp force, force deflection is avoided and an increase in the sealing force is achieved while using the same clamp.

The dosing module preferably comprises a cooling device, which has the flange for connection to the connecting flange of the exhaust pipe. The invention is suitable especially for liquid-cooled dosing modules since it is possible to implement positioning close to the exhaust gas with these. The cooling fluid, which can either be taken from the cooling circuit of the vehicle or can be a medium circulating in a separate circuit, allows efficient removal of the heat from the region of the valve tip, which cannot be achieved by means of an air cooling system. This makes it possible to position the valve tip close to the exhaust gas flow in the exhaust pipe. In the case of a liquid-cooled dosing module, the sealing element can be shifted into the region of a cooling chamber. By positioning the dosing module with the valve tip in the exhaust duct, in particular through the high temperatures and, where relevant, additionally through controlled removal through a heat shield, it is furthermore possible in a very effective way to prevent the reducing agent, e.g. "AdBlue®", from reaching the sealing zone, even making it possible to reduce the requirements on the seal. This can be taken into account in the dimensioning of the sealing element, especially when determining the thickness and when choosing the material. Thus, a single-layer metal half bead or a single-layer metal bead can be very suitable for effectively preventing the escape of the reducing agent from the interior of the exhaust pipe.

Advantages of the Invention

By means of the solution proposed according to the invention, the sealing zone in the case of a dosing module for dosing a reducing agent into the exhaust section of an internal combustion engine, which is embodied as a liquid-cooled dosing module in particular, is not positioned in the region of the valve tip but is shifted further up in the direction of the center of gravity of the dosing module. A reduced-vibration and strength-optimized connection of the dosing valve proposed according to the invention to the exhaust system is thereby achieved. In addition, the solution proposed according to the invention makes it possible to achieve a larger distance between the emergence of the reducing agent from the dosing module and the sealing zone. As a result, the requirements on the sealing concept are lower, thus making it possible to change over from a two-layer coated metal-bead seal, as used hitherto, to a single-layer uncoated metal-bead seal.

The solution proposed according to the invention furthermore advantageously makes it possible for the sealing surface on the dosing module to be designed with precisely the same slope angle as a clamp profile. An increased sealing surface in comparison with a horizontal embodiment is thereby achieved within the same radial installation space. In addition, direct introduction of the force of a clamp avoids deflection of the force and thus ensures an increase in the sealing force while using the same clamp.

The sealing element between the flange of the dosing module and the connecting flange of the exhaust pipe preferably lies in the vicinity of the center of gravity of the dosing module. "In the vicinity of the center of gravity of the dosing module" can mean that a region in which the flange of the dosing module and/or the mating flange of the exhaust pipe are arranged in the assembled state lies above and below the center of gravity by 10% to 20% of a height of the dosing module, in a hose for example. In respect of the position of the center of gravity, it is only the axial position thereof which is of concern in this context, i.e. the position in relation to the height of the dosing module, while the radial position of the center of gravity is immaterial.

Particularly in the case of the liquid-cooled dosing module presented, it is possible to shift the sealing zone into the vicinity of the center of gravity. In this way, the leverage on the seal is smaller, and therefore the requirements on the seal can be reduced. This can be taken into account in the dimensioning of the sealing element, especially in determining the thickness and in the choice of material. Reduced-vibration and optimized-strength connection to the exhaust system is thereby obtained. Thus, for example, a single-layer metal half bead or a single-layer metal bead can be very suitable for providing the linear seal in the vicinity of the center of gravity.

DETAILED DESCRIPTION

Figure 1:
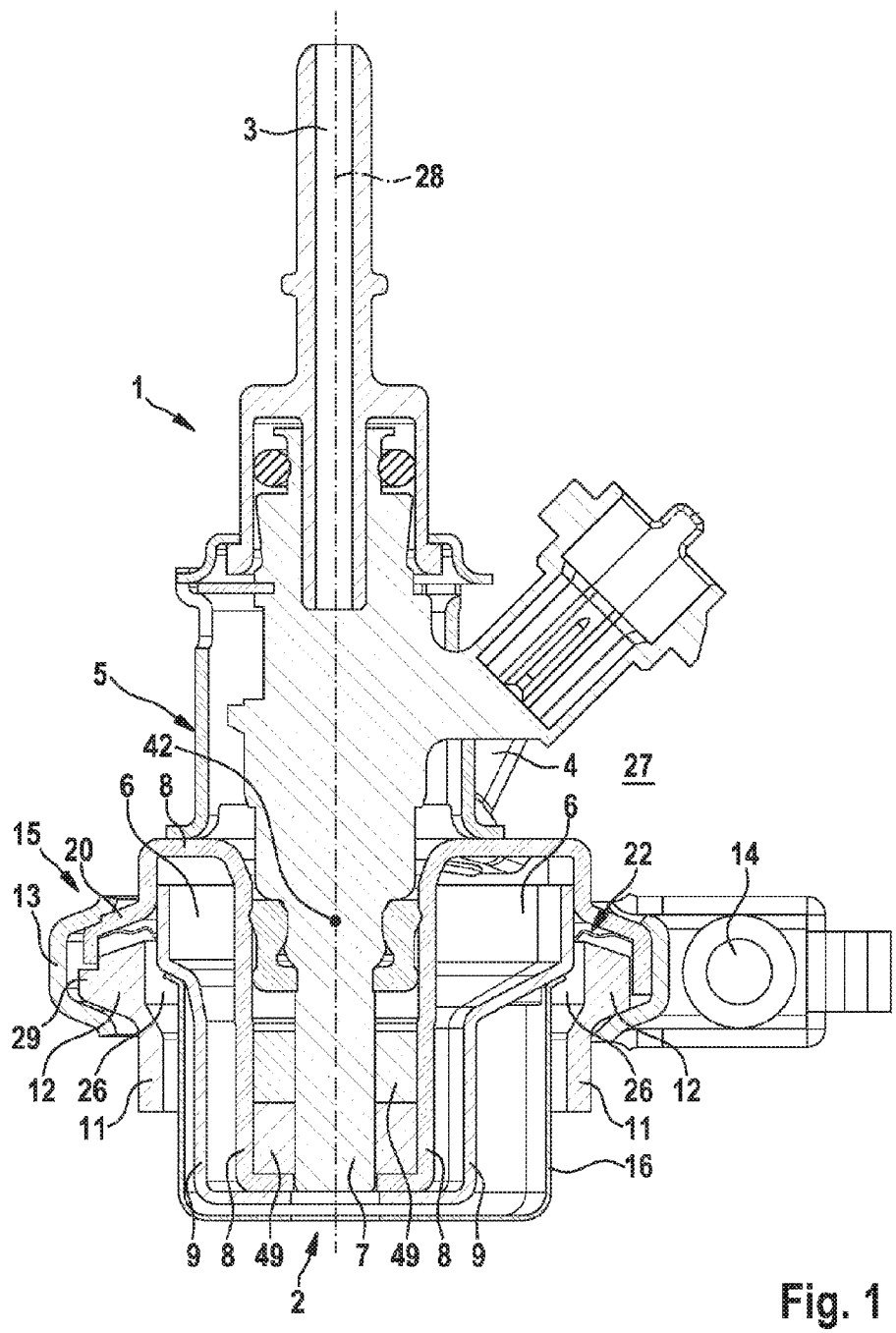
FIG. 1 shows a dosing module flanged onto a mating flange of an exhaust pipe in section

FIG. 1 shows a dosing module 1 flanged to a connecting flange 11 of an exhaust pipe in section. The dosing module 1 is designed to aftertreat an exhaust gas flow from an internal combustion engine by injecting a reducing agent into the exhaust pipe of the internal combustion engine. For this purpose, an outlet opening 2 of an injection valve 5, which is not shown in detail, opens into the exhaust pipe of the internal combustion engine. Of the exhaust pipe, only the connecting flange 11 is shown, which has a circumferential flange head 12 of widened cross section. FIG. 1 shows a section, wherein the section passes through one or more latching projections 29 on the left-hand side.

The dosing module 1 has at least one feed 3 for a reducing agent, e.g. for AdBlue®, and for compressed air, by means of which the reducing agent is atomized, and a further feed 4 for a cooling fluid, which opens into a cooling chamber 6 surrounding a valve tip region 7 of the injection valve 5. The cooling chamber 6 is formed from two materially interconnected sleeves, namely an inner sleeve 8 and an outer sleeve 9. It is also possible for the sleeves 8, 9 to be connected to one another by means of a positive connection, e.g. by a press fit. Arranged between the inner sleeve 8 and the valve tip region 7 are soft, plastically deformable elements 49, e.g. graphite blocks, which compensate for a manufacturing tolerance of the valve tip region 7 and can absorb transverse forces. In alternative embodiments of the invention, accurately fitting guides of the valve tip region 7 can be provided on the inner sleeve 8 of the cooling chamber 6.

The dosing module 1 furthermore has a heat shield 16, which is secured like an outer pot at certain points on the outer sleeve 9 of the cooling chamber 6, e.g. by spot welding. The dosing module 1 is introduced into the exhaust pipe of the internal combustion engine, and the outlet opening 2 of the injection valve 5 opens directly into the exhaust pipe. This is only possible through effective cooling since temperatures of up to 700° C. prevail in this zone. The heat shield 16 ensures that the reducing agent which emerges from the outlet opening 2 of the injection valve 5 does not creep along the outer sleeve 9 of the cooling chamber 6 and cool due to the cooling water but that emerging reducing agent is carried away along the heat shield 16, preventing it from cooling down and ensuring that combustion can take place more effectively in the exhaust pipe. Deposits within the exhaust system are thus avoided or considerably minimized.

In the region of a seal 15 between an interior 26 of the exhaust pipe and an exterior 27 of the exhaust pipe, the connecting flange 11 of the exhaust pipe and a flange 20 of the dosing module 1 are held by a clamp 13 for leaktight contact pressure between the flange 20 and the mating flange 11. The clamp 13 can be tightened by means of a fixing element 14 and can also be released again. In the region of the seal 15, the temperature is considerably lower than the temperatures of the exhaust gas flow in the center of the exhaust pipe since the heat is carried away into the heat shield 10 and the connecting flange 11 and, as a result, there is a large reduction in temperature. The center of gravity 42 of the dosing module 1 is in the region of the seal 15. This is possible by virtue of the positioning of the water-cooled valve tip 7 close to the exhaust gas.

Figure 2:
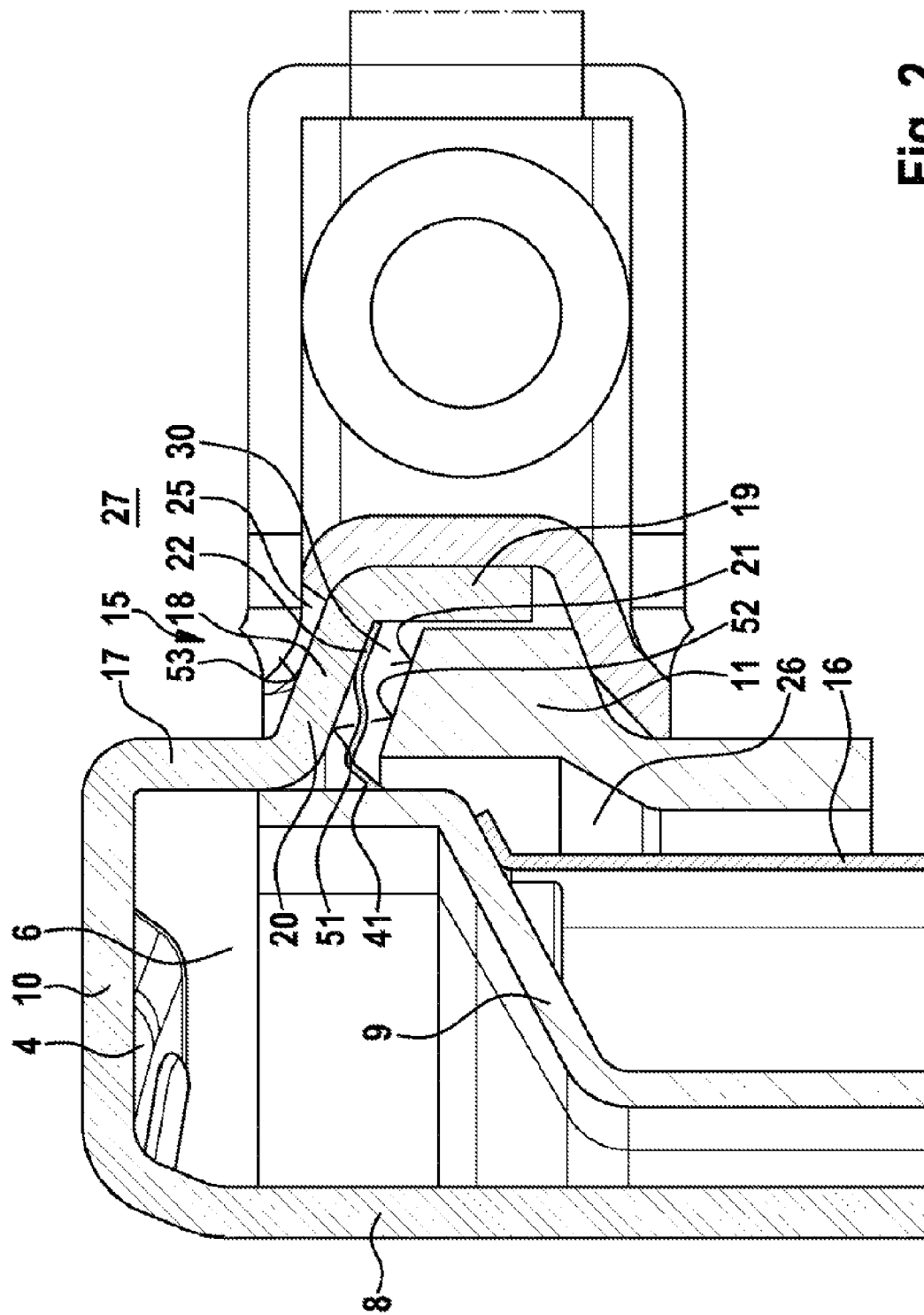
FIG. 2 shows a partial view of FIG. 1 with the seal between the flange and the mating flange

FIG. 2 shows a detail of FIG. 1 comprising the seal 15. The inner sleeve 8 and the outer sleeve 9 of the cooling chamber 6 are produced completely by the deep drawing process. The upper rim of the inner sleeve 8 is folded over outward and drawn radially outward, resulting in the formation of a radial portion 10 which forms a top of the cooling chamber 6. The feed 4 of the cooling fluid opens into the radial portion 10. The radial plane in which the radial portion 10 extends can be defined by an outlet opening of the connecting flange 11. The radial plane can also be defined in such a way that it lies substantially perpendicular to a principal axis 28 of the injection valve 5.

Adjoining the radial portion 10, the inner sleeve 8 is bent further in the same direction through 90° and forms an axially extending first skirt portion 17. The outer sleeve 9 of the cooling chamber 6 is secured, preferably welded, from the inside on the axially extending first skirt portion 17. Adjoining the axially extending first skirt portion 17 is a sloping portion 18, the inside of which forms a first sealing surface 51 for the seal 15. The sloping portion 18 is designed to slope at an angle of 10° to 45°, preferably 15° to 25°, particularly preferably 20°, relative to the radial portion 10. Adjoining the sloping portion 18 is an axially extending second skirt portion 19, which allows centering of the dosing module 1 on the connecting flange 11 of the exhaust pipe.

The connecting flange 11 has a likewise sloping end face 21, which forms a second sealing surface 52 for the seal 15. A sealing element 22 in the form of a metal half bead is arranged between the sloping portion 18 of the dosing module 1 or the cooling chamber 6 and the sloping end face 21 of the connecting flange 11. At least locally, the sealing element 22 has the same slope of between 10° and 45°, preferably between 15° and 25°, particularly preferably around 20°, as the sealing surfaces 51, 52 surrounding it. In the case of the half bead, a bead angle between the sloping portions is necessarily defined by the specifications for the breadth and height of the half bead. Radially on the inside, the sealing element 22 designed as a half bead has a retaining projection 41, which is supported against a wall of the dosing module 1, namely against the outer sleeve 9.

On the upper and lower sides, the clamp 13 has contact pressure flanks 25, which likewise slope relative to the radial plane at the same angle of between 10° and 45°, preferably between 15° and 25°, particularly preferably 20°, with the result that they rest in full surface contact on an outer surface 53 of the sloping portion 18.

Figure 3:
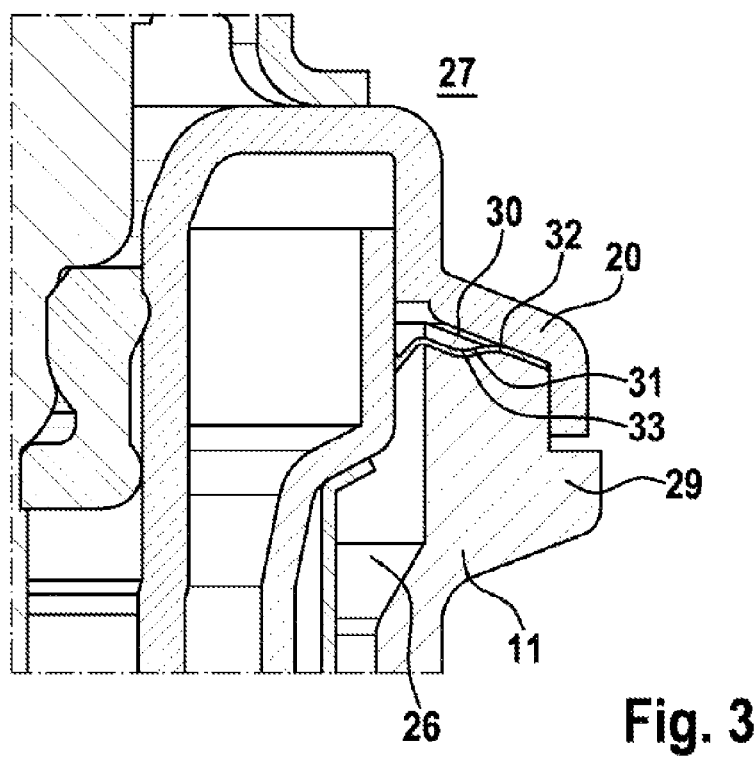
FIG. 3 shows a seal having a flange and a mating flange and a half bead sealing element
Figure 4:
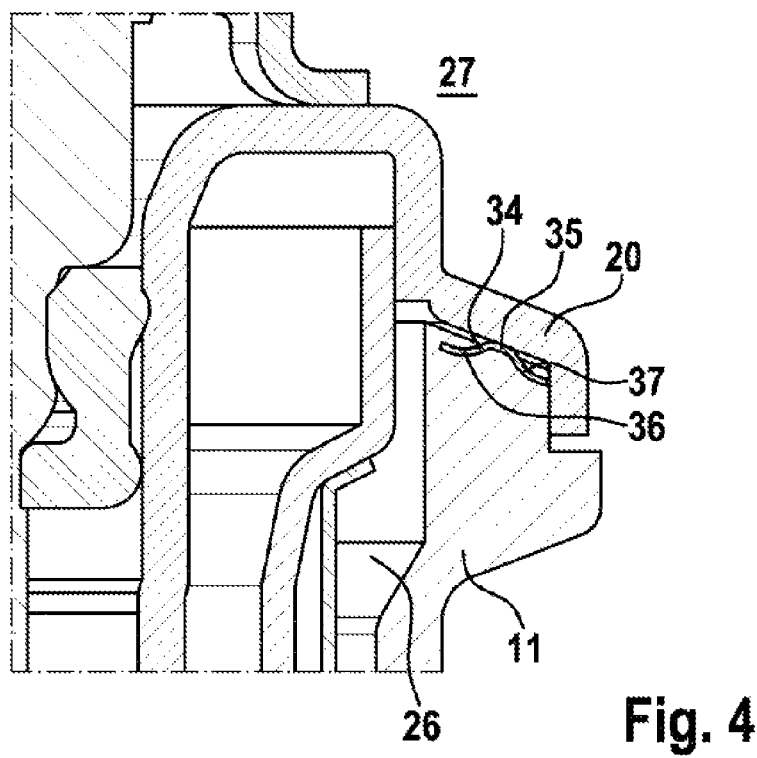
FIG. 4 shows another seal having a flange and a mating flange and a full bead sealing element
Figure 5:
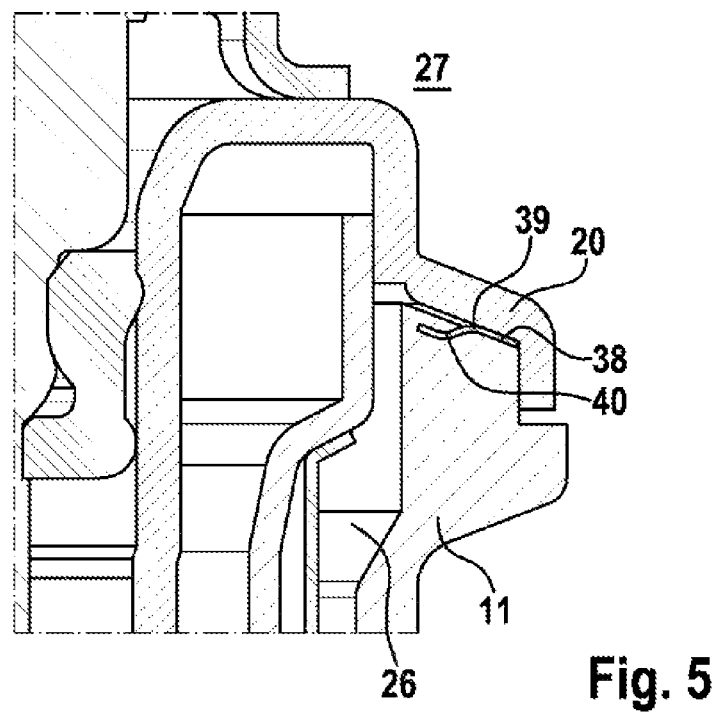
FIG. 5 shows another seal having a flange and a mating flange and a two-layer sealing element.

FIGS. 3 to 5 show embodiments of the seal 15 having the flange 20 and the connecting flange 11. The sealing element 22 is shown superimposed on the flange 20 and the connecting flange 11 in order to better indicate the shape thereof. In the assembled state, the sealing element 22 will of course be clamped in a gap 30 between the flange 20 and the connecting flange 11.

In the embodiment version shown in FIG. 3, the sealing element 22 is a metal half bead 31. The clamping which acts on the half bead 31 gives rise to a first microbend 32 in the half bead 31 in the direction of the flange 20 of the dosing module 1 and a second microbend 33 in the half bead 31 in the direction of the connecting flange 11 of the exhaust pipe. In the installed state, the clamping of the metal half bead between the flange 20 and the connecting flange 11 has the effect that the first microbend 32 in the half bead 31 forms a first sealing line with the flange 20 of the dosing module 1 for the interior 26 of the exhaust pipe with respect to the exterior 27, and the second microbend 33 in the half bead 31 forms a second sealing line with the connecting flange 11 of the exhaust pipe for the interior 26 of the exhaust pipe into the exterior 27, this being referred to as a linear seal.

The sealing element 22, which is of substantially annular design, is introduced between the flange 20 of the dosing module 1 and the connecting flange 11 of the exhaust pipe in the region of the center of gravity 42 of the dosing module 1. During the clamping of the flange 20 and of the connecting flange 11 by means of a clamp 13, microbends 32 and 33 (cf the illustration in FIG. 6) are formed, by means of which at least one linear sealing line is formed between the flange 20 of the dosing module, on the one hand, and the connecting flange 11 of the exhaust pipe, on the other.

The sealing element 22 does not necessarily have to have the shape of a metal half bead 31: other shapes can be provided to produce a linear seal on the sealing surface 18 of the flange 20 and on the sealing surface 21 of the connecting flange 12.

In FIG. 4, the sealing element 22 is embodied as a metal full bead 34. In the installed state, the clamping of the metal full bead 34 between the flange 20 and the connecting flange 11 has the effect that a first line 35 of increased pressure in the full bead 34 forms a first sealing line with the flange 20 of the dosing module 1 for the interior 26 of the exhaust pipe with respect to the exterior 27, a first microbend 36 in the full bead 34 forms a second sealing line with the connecting flange 11 of the exhaust pipe for the interior 26 of the exhaust pipe with respect to the exterior 27, and a second microbend 37 in the full bead 34 forms a third sealing line with the connecting flange 11 of the exhaust pipe for the interior 26 of the exhaust pipe with respect to the exterior 27, this being referred to jointly as a linear seal.

The sealing elements 22 illustrated in FIGS. 3 and 4 can also be introduced into the dosing module 1 in reverse, i.e. with the beading facing either upward or downward, with the linear seal according to the invention being ensured in either case.

In FIG. 5, the sealing element 22 is embodied as a double-layer sealing element 38. In the installed state, the clamping of the double-layer sealing element 38 between the flange 20 and the connecting flange 11 has the effect that a first microbend 39 in the double-layer sealing element 38 forms a first sealing line with the flange 20 of the dosing module 1 for the interior 26 of the exhaust pipe with respect to the exterior 27, and a second microbend 40 in the double-layer sealing element 38 forms a second sealing line with the connecting flange 11 of the exhaust pipe for the interior 26 of the exhaust pipe with respect to the exterior 27, this being referred to jointly as a linear seal.

Figure 6:
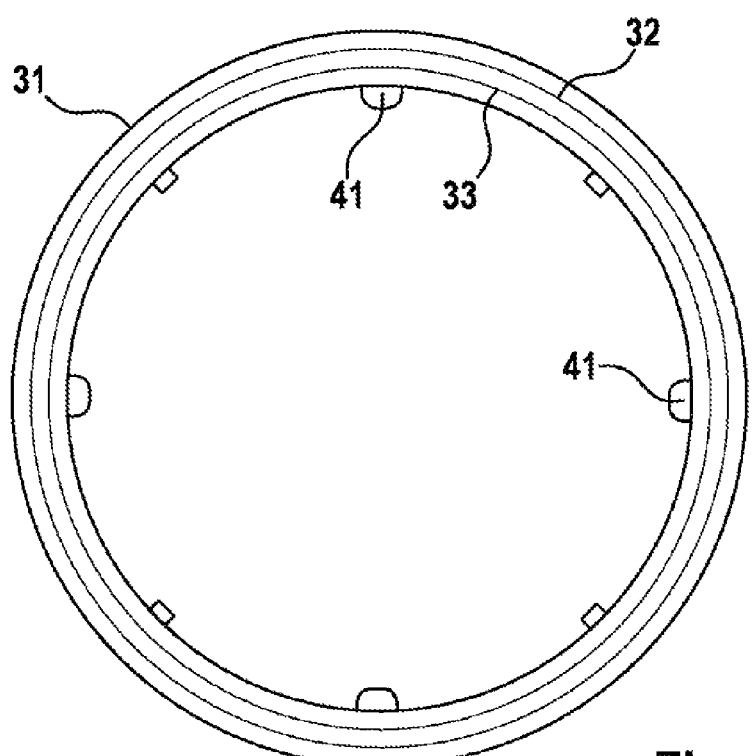
FIG. 6 shows a sealing element in plan view.

FIG. 6 shows the sealing element 22 in the embodiment as a half bead 31 in plan view. Owing to the radial symmetry of the flange 20 and of the connecting flange 11, the linear seal in this illustrative embodiment comprises a first circumferentially extending line of high pressure between the sealing element 22 and the flange 20 of the dosing module 1 as a first microbend 32 of the half bead 31; and furthermore comprises a second circumferentially extending line of high pressure between the sealing element 22 and the connecting flange 11 of the exhaust pipe as a second microbend 33 of the half bead 31, wherein the two circumferentially extending lines are arranged concentrically. Depending on the embodiment, the line of high pressure between the sealing element 22 and the flange 20 is longer than the line of high pressure between the sealing element 22 and the connecting flange 11 of the exhaust pipe or vice versa. In addition, eight retaining projections 41 distributed at equidistant angles are shown here by way of example, supporting and positioning the sealing element 22 against the outer sleeve 9 of the cooling chamber 6, e.g. for transportation purposes.

Owing to its cooling with a cooling fluid, e.g. cooling water, the dosing module 1 provided according to the invention can project further into the exhaust pipe of the internal combustion engine, in comparison with a dosing module provided with an air cooling system. For reasons connected with temperature, the latter must be pulled further out of the exhaust pipe, with the result that the center of gravity of such a dosing module comes to be further out. In the case of the dosing module 1 proposed according to the invention, the seal 15, i.e. the sealing element 22, can advantageously be shifted into the region of fastening between the flange 20 and the connecting flange 11, with the result that the center of gravity 42 and the sealing zone, i.e. the position of the sealing element 22, advantageously coincide.

What is claimed is:

1. A dosing module (1) for introducing a reducing agent into an exhaust section of an internal combustion engine for exhaust aftertreatment, wherein the dosing module (1) has a longitudinal axis (28), a length, a center of gravity (42), and defines a plane which is arranged perpendicular to the longitudinal axis (28) and on which the center of gravity (42) is arranged, and comprises a dosing module flange (20), which is secured on a connecting flange (11) of an exhaust pipe, wherein a sealing element (22) is arranged between the dosing module flange (20) and the connecting flange (11), characterized in that the sealing element (22), which separates an interior (26) of the exhaust pipe from an exterior (27) of the exhaust pipe, is mounted in a region defined within a distance less than or equal to twenty percent of the length from the plane in a direction parallel the longitudinal axis (29).

2. The dosing module as claimed in claim 1, characterized in that the sealing element (22) is formed from a half bead (31) or a full bead (34).

3. The dosing module (1) as claimed in claim 1, characterized in that the sealing element (22) is ring shaped and has at least one microbend (32, 33; 36, 37) representing a linear seal.

4. The dosing module (1) as claimed in claim 1, characterized in that at least one of the dosing module flange (20) and the connecting flange (11) have at least one sloping sealing surface (51, 52).

5. The dosing module (1) as claimed in claim 4, characterized in that a slope angle of the at least one sloping sealing surface (51, 52) is between 10° and 45° relative to a radial plane.

6. The dosing module (1) as claimed in claim 4, characterized in that a slope angle of the at least one sloping sealing surface (51, 52) is between 15° and 25° relative to a radial plane.

7. The dosing module (1) as claimed in claim 4, characterized in that a slope angle of the at least one sloping sealing surface (51, 52) is about 20° relative to a radial plane.

8. The dosing module (1) as claimed in claim 1, characterized in that the dosing module flange (20) and the connecting flange (11) are connected by a clamp (13), wherein the clamp (13) has a contact pressure flank (25), which rests in full surface contact on an outer surface (53) of the dosing module flange (20).

9. The dosing module (1) as claimed in claim 1, characterized in that the sealing element (22) is a single-layer ring of material.

10. The dosing module (1) as claimed in claim 1, characterized in that the sealing element (22) has retaining projections (41), which are supported against a wall of an outer sleeve (9) of the dosing module (1).

11. The dosing module (1) as claimed in claim 1, characterized in that the sealing element (22) is clamped between the dosing module flange (20) and the connecting flange (11) within a sloping portion (18) of the dosing module flange (20).

12. The dosing module (1) as claimed in claim 1, further comprising a heat shield (16) having an axial length, characterized in that a distance between the sealing element (22) and a valve tip region (7) corresponds at least to the axial length.

13. The dosing module (1) as claimed in claim 12, characterized in that the heat shield (16) is in the form of a pot and is attached materially at certain points to an outer sleeve (9).

14. The dosing module (1) as claimed in claim 12, characterized in that the heat shield (16) is in the form of a pot and is spot-welded at certain points to an outer sleeve (9).

15. The dosing module as claimed in claim 1, characterized in that the sealing element is a single layer.

16. The dosing module as claimed in claim 1, characterized in that means for cooling said module with water are provided.

17. The dosing module (1) as claimed in claim 1, characterized in that the dosing module flange (20) and the connecting flange (11) are connected by a clamp (13), wherein the clamp (13) has a contact pressure flank (25), which rests in full surface contact on a sloping portion of a the dosing module flange (20).

18. The dosing module (1) as claimed in claim 1, characterized in that the sealing element (22) is a single-layer metal ring.

* * * * *